(12) United States Patent
Takenaka et al.

(10) Patent No.: US 8,555,660 B2
(45) Date of Patent: Oct. 15, 2013

(54) OPERATION UNIT FOR VEHICLE AIR CONDITIONER AND VEHICLE AIR-CONDITIONING CONTROL APPARATUS USING THE SAME

(75) Inventors: Kenichi Takenaka, Handa (JP); Kuniharu Kutsuna, Okazaki (JP); Kazumutsu Azuma, Nishikamo-gun (JP); Hiroki Iwashita, Kariya (JP); Yuji Kawamoto, Kariya (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 1564 days.

(21) Appl. No.: 12/082,806

(22) Filed: Apr. 14, 2008

(65) Prior Publication Data

US 2008/0264079 A1 Oct. 30, 2008

(30) Foreign Application Priority Data

Apr. 25, 2007 (JP) ................. 2007-115330

(51) Int. Cl.
*F25B 49/00* (2006.01)

(52) U.S. Cl.
USPC .............. 62/126; 62/127; 62/133; 62/161; 62/163; 62/178; 62/186; 62/244; 236/49.3; 236/51; 236/94; 340/438; 340/459; 340/461; 340/815.4; 340/815.58; 340/815.78; 200/308; 200/316; 454/75

(58) Field of Classification Search
USPC ........... 62/126, 127, 133, 161, 163, 178, 186, 62/244; 236/49.3, 51, 94; 340/438, 459, 340/461, 815.4, 815.58, 815.78; 200/308; 200/316; 454/75
See application file for complete search history.

(56) References Cited

U.S. PATENT DOCUMENTS 5,931,378 A * 8/1999 Schramm ................ 236/94
6,744,422 B1 * 6/2004 Schillings et al. ............ 345/169
2006/0145888 A1 * 7/2006 Aoki .................... 340/815.78

FOREIGN PATENT DOCUMENTS

| JP | 61-131307 | | 8/1986 |
| JP | 11-254951 | | 9/1999 |
| JP | 2001047877 A | * | 2/2001 |

(Continued)

OTHER PUBLICATIONS

Office action dated Mar. 11, 2010 in corresponding Japanese Application No. 2007-115330.
Office action dated Jan. 21, 2009 in Japanese Application No. 2007-11533.

(Continued)

*Primary Examiner* — Frantz Jules
*Assistant Examiner* — Azim Abdur Rahim
(74) *Attorney, Agent, or Firm* — Harness, Dickey & Pierce, PLC

(57) ABSTRACT

An operation unit for a vehicle air conditioner includes a display device, a setting input portion of a control parameter of the air conditioner other than a set temperature, an obtaining portion configured to obtain a present set value of the control parameter, and an operating state identification portion configured to identify whether an air-conditioning operating state is in a plurality of predetermined operating states of the air conditioner. In the operation unit, a moving pattern of a pointer of the display device is changed according to the operating state of the air conditioner. For example, a pointer operation control portion can be configured to control an operation of a pointer driving motor such that the pointer moves on a dial of the display device at different moving speeds according to the air-conditioning operating state.

26 Claims, 7 Drawing Sheets

(56) References Cited

FOREIGN PATENT DOCUMENTS

| JP | 2002-071389 | 3/2002 |
|---|---|---|
| JP | 2006-200844 | 8/2006 |
| JP | 2006-226953 | 8/2006 |
| JP | 2006-234628 | 9/2006 |
| JP | 2008-247272 | 10/2008 |

OTHER PUBLICATIONS

Office action dated Jan. 21, 2009 in Japanese Application No. 2007-115330.
Office action dated Aug. 24, 2010 in corresponding Japanese Application No. 2007-115330.

* cited by examiner

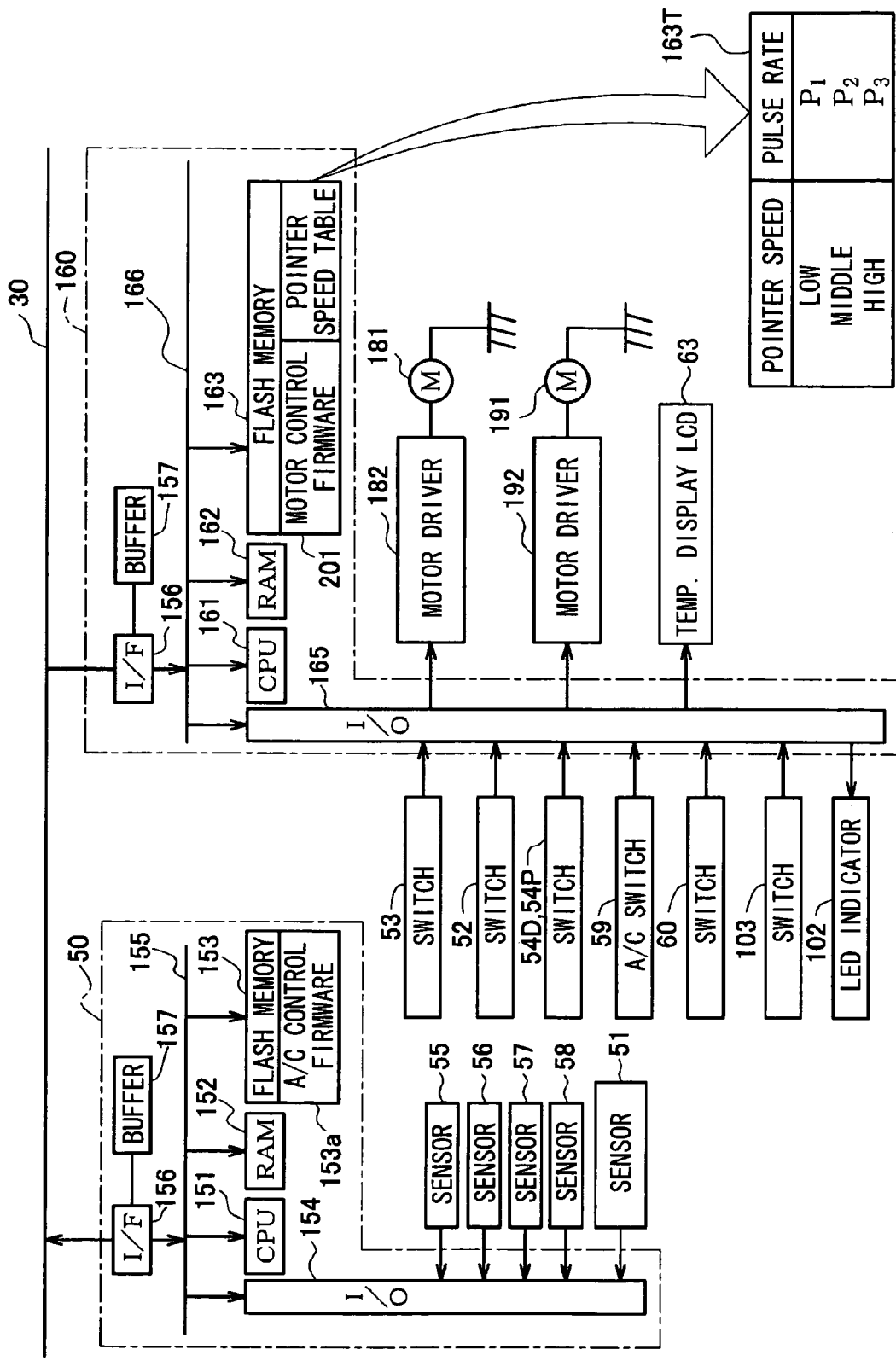

OPERATION UNIT FOR VEHICLE AIR CONDITIONER AND VEHICLE AIR-CONDITIONING CONTROL APPARATUS USING THE SAME

CROSS REFERENCE TO RELATED APPLICATION

This application is based on Japanese Patent Application No. 2007-115330 filed on Apr. 25, 2007, the contents of which are incorporated herein by reference in its entirety.

FIELD OF THE INVENTION

The present invention relates to an operation unit for a vehicle air conditioner, and a vehicle air-conditioning control apparatus using the same.

BACKGROUND OF THE INVENTION

JP-A-2002-71389 discloses a pointer type display device that improves visibility of present set contents of control parameters, including an amount of air and a set air outlet, in an operation panel for an air conditioner used in a vehicle or the like, while enhancing the design quality of the operation panel. When the display device shows that the air conditioner is in a manual mode, a pointer is rotatably driven in an analog manner by a motor on a dial in response to changing of a set value of the parameter by the operation of a dial knob. Further, when the amount of air or the set air outlet is automatically changed on the air conditioner side for automatic temperature control in an automatic mode, a changing parameter set value is timely displayed in the analog manner by the pointer. Thus, the present parameter set value can be directly read at any time, to lead to more detailed understanding of an operating state of the air conditioner in the automatic mode.

In the structure disclosed in JP-A-2002-71389, however, the pointer is moved uniformly regardless of the operating mode of the air conditioner. By only looking at the state of the display device, it is impossible to immediately determine in which mode the air conditioner is now operating.

SUMMARY OF THE INVENTION

In view of the foregoing problems, it is an object of the invention to provide an operation unit for a vehicle air conditioner, which can easily identify whether or not the vehicle air conditioner is in a specific operating state from an operating state of a pointer type display device. It is another object of the invention to provide a vehicle air-conditioning control apparatus using the operation unit.

According to an aspect of the present invention, an operation unit for a vehicle air conditioner includes: a display device including a dial calibrated such that a present set value of a control parameter other than a set temperature of the air conditioner is directly readable, a pointer rotatably disposed on the dial, and a pointer driving motor for rotatably driving the pointer; a setting input portion of the control parameter; an obtaining portion configured to obtain the present set value of the control parameter; and an operating state identification portion configured to identify whether an air-conditioning operating state is in a plurality of predetermined operating states of the air conditioner. In the operation unit, a moving pattern of the pointer is changed according to the operating state of the air conditioner. Accordingly, it is easily identify whether or not the vehicle air conditioner is in a specific operating state from an operating state of the pointer type display device.

The operation unit for a vehicle air conditioner may be used for a vehicle air-conditioning control apparatus. In this case, an air-conditioner driving control portion of the control apparatus may be configured to control a driving of the vehicle air conditioner based on the set input value of the control parameter from the setting input portion. Furthermore, the vehicle air-conditioning control apparatus may include a mode switching portion adapted to switch the operating mode of the air conditioner between the manual mode and the automatic mode based on information input from the mode switching input portion. In this case, the air-conditioner driving control portion controls the driving of the vehicle air conditioner in either the manual or automatic mode.

For example, a pointer operation control portion may be configured to control an operation of the pointer driving motor such that the pointer moves on the dial at different moving speeds according to the air-conditioning operating state identified in response to a change with time in the obtained set value of the control parameter. As a result, the user can easily identify whether or not the vehicle air conditioner is in a specific operating state from the moving speed of the pointer.

The operation unit may further include a mode switching input portion and a pointer operation control portion. Here, the mode switching input portion is configured to switch the operation of the air conditioner between a manual mode in which the set value of the control parameter is input and set manually regardless of a set temperature of the air conditioner, and an automatic mode in which the control parameter is controlled to be automatically changed according to the set temperature of the air conditioner. Furthermore, the pointer operation control portion is configured to control an operation of the pointer driving motor. In this case, the operating state identification portion is adapted to identify whether the air conditioner is in the manual mode or in the automatic mode, and the pointer operation control portion is adapted to drive the pointer at different speeds between in the manual mode and in the automatic mode.

In the automatic mode, operation control is performed by automatically adjusting the set value of each control parameter such that the temperature of a vehicle interior is kept at an air-conditioner set temperature input and set by the operation of a user or the like. The control parameters include the amount of air to be blown from the air conditioner, the mode of an air outlet, and a ratio of combination of the warm air and the cold air (for example, an opening degree of an air mix damper), for example. The set value of each control parameter is adjusted such that a detection value of the temperature of the vehicle interior becomes closer to the air-conditioner set temperature. In this case, in order to allow the temperature of the vehicle interior to reach or come into equilibrium with the air-conditioner set temperature in a shorter time, disturbance factors including an outside air temperature and a degree of solar radiation are detected separately, and thus a changing sequence of the set value of each control parameter is adjusted.

The moving speed of the pointer in the display device may be set to differ according to whether the vehicle air conditioner is operated in the manual mode or in the automatic mode. Thus, the pointer speed enables easy determination of whether the present operating mode is the manual or automatic mode. The use of the pointer type display device allows the present set value of the control parameter to be directly read out even in the automatic mode. Thus, it is possible for the user to find the automatic mode based on the moving speed of the pointer. Also, when a setting state of the control parameter is not satisfied, the setting state can be advantageously quickly changed to a favorite setting state by switching to the manual mode.

For example, the control parameter may be at least one of an amount of air to be blown into a vehicle compartment and an air outlet mode for an airflow from the air conditioner, and the display device may display at least one of the present set value of the amount of blown air and the air outlet mode. As an example, the control parameter may be the amount of blown air blown from the air conditioner as mentioned above. The pointer type display device may be configured to display the present set value of the amount of blown air. When the passenger of the vehicle is unsatisfied with the state of the air conditioner, the most anxious matter may be first the amount of air blown from the air conditioner next to the blowoff air temperature. Displaying the present set value of the amount of blown air in the pointer type display device can relieve the passenger's worries about the air amount. Further, it can quickly lead to a specific action taken by the passenger, including changing the air amount.

In the manual mode, at least one of the amount of blown air and the air outlet mode for the airflow from the air conditioner can be manually set, whereas in the automatic mode, at least one of the amount of blown air and the air outlet mode for the airflow from the air conditioner can be automatically switched. For example, the display device includes a first display unit for displaying the present set value of the amount of blown air as the control parameter, and a second display unit for displaying the present set air outlet mode as the control parameter. In this case, the pointer operation control portion can drive the pointer at different speeds between the manual mode and the automatic mode in at least one of the first display unit and the second display unit.

For example, in the manual mode, the air outlet for the airflow in the air conditioner is manually set. In contrast, in the automatic mode, the air outlet can be automatically switched to another one. In this case, the pointer type display device can be configured to include a first display unit for displaying the present set value of the amount of blown air as the control parameter, and a second display unit for displaying the present set type of the air outlet as the control parameter. The pointer operation control portion can be configured to at least drive the pointer at different speeds between the manual mode and the automatic mode in the first display unit. The first display unit is to display the air amount, which is the most anxious matter to the passenger, and can be viewed most frequently by the passenger, thereby allowing the passenger to more quickly understand the present set mode. In this case, it is more effective that the pointer operation control portion drives the corresponding pointer at the different speeds between the manual mode and the automatic mode in each of the first and second display units. In the automatic mode, the air amount may be manually controlled, but only the air outlet may be automatically switched. In this case, the pointer operation control portion drives the pointer at the different speeds between the manual mode and the automatic mode only in the second display unit.

The pointer operation control portion may be configured to drive the pointer at a lower speed in the automatic mode than in the manual mode. In the manual mode, the quick movement of the pointer following a change of the control parameter by the user allows the user to feel less strange in operation thereof. In contrast, in the automatic mode in which the control parameter is changed under the initiative of the vehicle, the movement of the pointer does not need to take into consideration a user's operation intention, and thus is purposely set at the low speed. This can make an atmosphere in which the control is performed automatically and smoothly to achieve the sophistication.

For example, the setting input portion can be adapted to input the set value of the control parameter so as to be capable of changing the set value in stages, and the obtaining portion sequentially obtains the set value of the control parameter input that is changed in stages by the setting input portion in the manual mode. In this case, the pointer operation control portion drives the pointer in the manual mode in such a stepwise manner that the pointer temporarily stops at each position corresponding to the set value obtained in stages. Accordingly, it can improve the operability of the pointer following the setting input operation, whereby the user feels less frustrated. In this case, when the setting input portion is operated at a normal speed, an angle moving speed of the pointer for one corresponding stage is sufficiently large as compared to the speed at which the setting input portion is operated by one stage in units of operation. This achieves the stepwise driving of the pointer as mentioned above.

In contrast, in the automatic mode, the obtaining portion obtains the set value of the control parameter automatically changed as needed. When the set value is automatically changed by a span corresponding to an integral multiple of two or more times of a unit of operation of the setting input portion in the manual mode, the pointer operation control portion drives the pointer in such a manner that the pointer continuously moves in an angle interval corresponding to the span. Thus, the pointer can continuously move slowly in a relatively large angle interval corresponding to the change in set value, thereby enhancing the presentation of the automatic mode.

The pointer driving motor may be constructed of, for example, a stepping motor. In this case, the pointer operation control portion can easily set and change the driving speed of the pointer by an input pulse rate into the stepping motor. The driving motor is not limited to the stepping motor, and may be constructed of, for example, a brushless motor. In this case, the driving speed of the pointer can be set and changed by PWM control or the like of an AC driving input waveform.

BRIEF DESCRIPTION OF THE DRAWINGS

Additional objects and advantages of the present invention will be more readily apparent from the following detailed description of preferred embodiments when taken together with the accompanying drawings. In which:

FIG. 3 is a block diagram showing control parts of the vehicle air-conditioning control apparatus in FIG. 2;

DETAILED DESCRIPTION OF PREFERRED EMBODIMENTS

An embodiment and modifications thereof will be described below with reference to the accompanying drawings.

Figure 1:
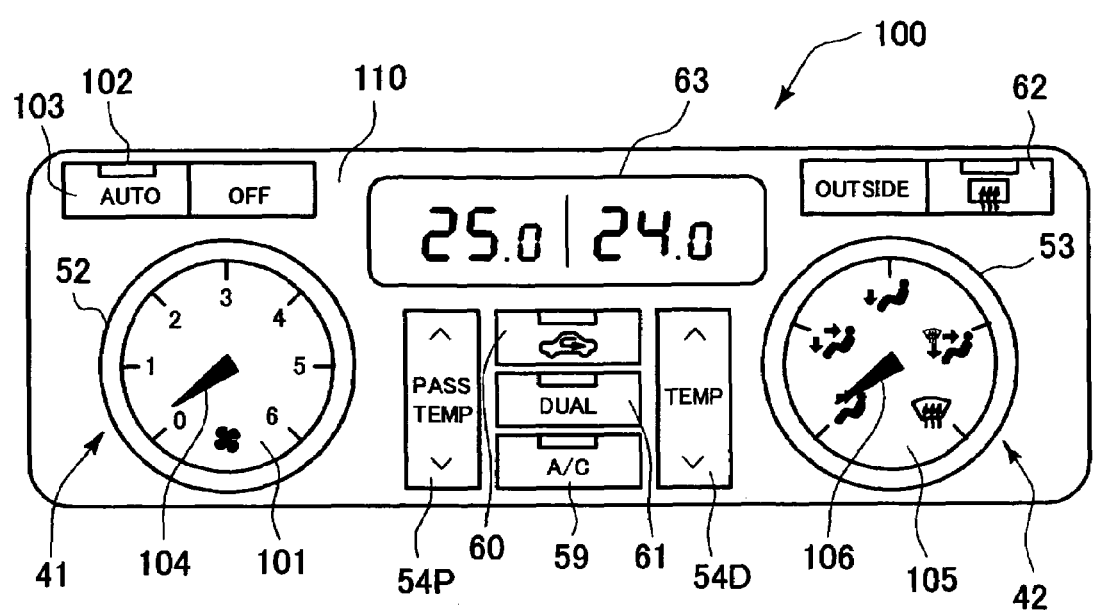
FIG. 1 is a front view showing an example of an operation unit for a vehicle air conditioner according to an embodiment of the invention.

FIG. 1 shows an example of a contour of the front side of an operation unit 100 for a vehicle air conditioner according to an embodiment. The operation unit 100 is adapted to independently perform air-blowing control from an air outlet (not shown) of the air conditioner for a driver's seat and from an air outlet (not shown) of the air conditioner for a front passenger's seat. The air outlets are provided in an instrument panel of the vehicle. A temperature setting switch 54D for the driver's seat and a temperature setting switch 54P for the front passenger's seat, each constructed of a sliding switch, are disposed separately on the right and left sides with respect to a frame panel 110.

The frame panel 110 includes, as a pointer type display device, a first display unit 41 for displaying a present set value of an amount of blown air as a control parameter and a second display unit 42 for displaying a present set air outlet as another control parameter. The first display unit 41 includes a dial 101 calibrated such that the present set value of the amount of blown air is directly readable, a pointer 104 rotatably disposed on the dial 101, and a pointer driving motor 181 (see FIG. 3) for rotatably driving the pointer 104. The second display unit 42 includes a dial 105 calibrated such that the present set value of the air outlet can be directly read out, a pointer 106 rotatably disposed on the dial 105, and a pointer driving motor 191 (see FIG. 3) for rotatably driving the pointer 106.

Either of the dials 101 or 105 has numerical values of the air amounts or scale graphics, including icons indicative of the air outlets, printed thereon. The units 41 and 42 each have a circular shape. A dial type air-amount setting switch (i.e., air-amount setting input portion) 52 is rotatably installed on the outer peripheral edge of the first display unit 41. A dial type air-outlet selector switch (i.e., air outlet setting input portion) 53 is rotatably installed on the outer peripheral edge of the second display unit 42.

The frame panel 110 is also provided with a set temperature display unit 63 for temperature setting switches 54D and 54P on the right and left sides of the panel, and a cooperation mode selection switch 61 for both the temperature setting switches 54D and 54P. For example, the set temperature display unit 63 can be constructed of a liquid crystal display. The frame panel 110 is further provided with an automatic selector switch 103, an A/C switch 59, a rear defroster mode selection switch 62, and an inside/outside air selector switch 60. The automatic selector switch 103 is one example of the mode switching input portion, and includes a LED indicator 102 which is adapted to light up in the automatic mode.

Figure 2:
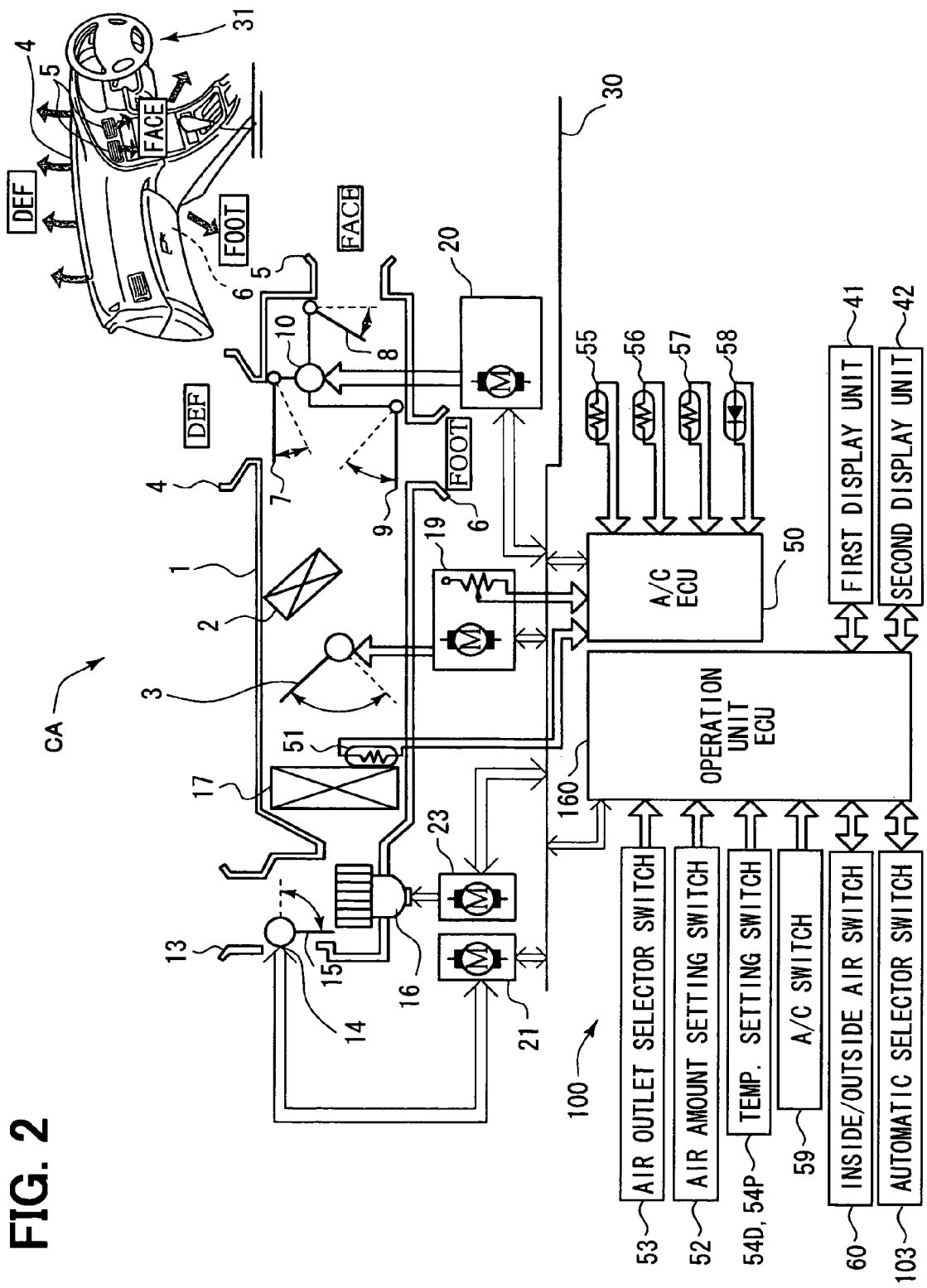
FIG. 2 is a schematic diagram showing an example of a vehicle air-conditioning control apparatus according to the embodiment of the invention.

FIG. 2 is a diagram schematically showing the entire structure of an air-conditioning control apparatus CA. The air-conditioning control apparatus CA includes a duct 1. In the duct 1, an inside air suction port 13 for circulating the air in a vehicle compartment, and an outside air suction port 14 for sucking the air outside the vehicle are provided. An inside/outside air switching damper 15 is used to switch between the suction ports 13, 14. The air from the inside air suction port 13 or the outside air suction port 14 is drawn into the duct 1 by a blower 16 driven by a blower motor 23.

In the duct 1, an evaporator 17 is provided for cooling the drawn air to generate cold air, and a heater core 2 is provided for heating the drawn air to generate warm air by using exhaust heat from an engine coolant. The cold air and the warm air are mixed at a ratio corresponding to the operation position of an air mix damper 3, and the mixed air having a desired temperature is blown off from at least one of air outlets 4, 5, and 6. The defroster air outlet 4 (DEF) for defogging the windshield of the vehicle is opened behind the upper portion of the instrument panel corresponding to the lower edge of an inner surface of the windshield. The face air outlet 5 is opened in the center portion of the front side of the instrument panel. The foot air outlet 6 is opened in a position opposed to foot areas of a passenger behind the lower surface of the instrument panel. The air outlets 4, 5 and 6 are opened and closed independently by dampers 7, 8 and 9 for switching among the air outlets. Specifically, a damper driving gear mechanism 10 is adapted to switch among the following states according to a rotational input phase for damper control from a motor 20: a state in which only the defroster air outlet 4 is opened, a state in which only the face air outlet 5 is opened, a state in which only the foot air outlet 6 is opened, a state in which the face air outlet 5 and the defroster air outlet 4 are opened, a state in which the foot air outlet 6 and the defroster air outlet 4 are opened, and a state in which all of the face air outlet 5, the defroster air outlet 4 and the foot air outlet 6 are opened.

The inside/outside air switching damper 15 is electrically driven by a motor 21. The air mix damper 3 is electrically driven by a motor 19. The dampers 7, 8, and 9 for switching among the air outlets are electrically driven by the motor 20. Each of the motors 19, 20, and 21 may be constructed of, for example, a stepping motor, and operation thereof can be collectively controlled by an air conditioner ECU 50 (A/C ECU). The blower motor 23 is constructed of a brushless motor or the like, and adjusts an amount of air to be blown by PWM control of a rotation speed. The air conditioner ECU 50 is substantially computer hardware in which a CPU 151, a RAM 152, a flash memory 153 storing therein an air-conditioning control firmware 153a, and an input/output unit 154 (I/O) are connected to one another via an inner bus 155. The input/output unit 154 is connected to an evaporator sensor 51, an inside air sensor 55, an outside air sensor 56, a water temperature sensor 57, and a solar radiation sensor 58.

As shown in FIG. 2, the operation unit 100 for a vehicle air conditioner also includes an independent operation unit ECU 160, which is connected to the air amount setting switch 52, the air outlet selector switch 53, the temperature setting switches 54D and 54P, the A/C switch 59, the automatic selector switch 103, the inside/outside air selector switch 60, the first display unit 41, and the second display unit 42 described above. As shown in FIG. 3, the operation unit ECU 160 is connected to respective elements via a serial communication interface 156 together with a communication buffer 57, by the air conditioner ECU 50 and the communication bus 30 (for example, a serial communication bus, such as a LIN communication bus).

The operation unit ECU 160 is also computer hardware in which a CPU 161, a RAM 162, a flash memory 163 storing therein a motor control firmware for driving a pointer and a pointer speed table 163T, and an input/output unit 165 (I/O) are connected to one another via an inner bus 166. The input/output unit 165 is connected to the air amount setting switch 52, the air outlet selector switch 53, the temperature setting switches 54D and 54P, the A/C switch 59, the automatic selector switch 103, the inside/outside air selector switch 60, the first display unit 41, and the second display unit 42 described above. Also, the operation unit ECU 160 is connected to the LED 102 for an indicator and to the set temperature display unit 63. The motors 181 and 191 for driving the respective pointers of the first and second display units 41 and 42 each are constructed of a stepping motor in this embodiment. The motors 181 and 191 are connected to the input/output unit 165 via respective motor drivers 182 and 192.

The motor drivers 182 and 192 are the known logic sequencers for receiving driving pulse signals in the positive and negative directions, and for exciting and driving the stepping motors 181 and 182 in the respective directions. The motor drivers 182 and 192 each include a driving pulse counter, and a driving pulse controller (constructed of a microcomputer or a logic dedicated thereto). The driving pulse controller compares the present angular position of the motor indicated by the driving pulse counter with a command angle value from the operation unit ECU 160. Thus, the driving pulse controller outputs a driving pulse signal in the positive or negative direction required to rotate a rotational angular position of the motor up to the command angle value to the above logic sequencer. In occurrence of the driving pulse input into the logic sequencer, the pointer of the pointer type display device 41 is rotatably driven in the form of setting the command angle value as a target position. When no driving pulse input is generated, the position of the pointer is self-held.

The respective operation input states of the air amount setting switch 52, the air outlet selector switch 53, the temperature setting switches 54D and 54P, the A/C switch 59, the automatic selector switch 103, and the inside/outside air selector switch 60 are fed to the air conditioner ECU 50 from the operation unit ECU 160 via the communication bus 30.

Specifically, the air conditioner ECU 50 executes the air conditioner control firmware 153a in cooperation with the operation unit ECU 160 to perform the following control.

A control command is given to a driving IC of a corresponding motor 21 such that the inside/outside air switching damper 15 is inclined toward either the inside-air side or the outside-air side according to an operation input state of the inside/outside air selector switch 60.

The evaporator 17 is turned on or off according to an operation state of the A/C switch 59.

The operating mode of the air conditioner is switched between the manual mode and the automatic mode based on an input state of the automatic selector switch 103 (i.e., mode switching portion).

In the automatic mode, operation control commands are given to the respective motors 19, 23, and 20 so as to adjust the air temperature to be blown into the vehicle compartment by adjustment of an opening degree of the air mix damper 3, to adjust the air amount by the blower motor 23, and to change the positions of the air outlet switching dampers 7, 8, and 9. The control commands are provided referring to information about the set temperatures input by the temperature setting switches 54D and 54P and information output from the inside air sensor 55, the outside air sensor 56, the water temperature sensor 57, and the solar radiation sensor 58 in accordance with the known sequence such that the temperature of the vehicle interior approaches the set temperature.

In the manual mode, according to operation input states of the air amount setting switch 52 and the air outlet selector switch 53, the amount of air is adjusted by the blower motor 23, and a driving control command is given to the motor 20 such that each of the air outlet switching dampers 7, 8, and 9 is brought into a corresponding open or closed state.

The values of the respective control parameters from the air conditioner ECU 50 indicative of the above-described operating state of the air conditioner, that is, the set value of the air amount and the set value indicative of a selection state of the air outlet are fed to the operation unit ECU 160 via the communication bus 30 as the control value determined at the air conditioner ECU 50. Also, information indicative of an operating mode set state (automatic/manual mode) on the air conditioner ECU 50 side is fed to the operation unit ECU 160 via the communication bus 30. In the operation unit ECU 160, the pointer 104 of the first display unit 41 indicative of the air amount set value and the pointer 106 of the second display unit 42 indicative of the selection state of the air outlet are driven by the respective motors 181 and 191 based on the information received from the air conditioner ECU 50. Thus, the air conditioner ECU 50 can identify an air conditioner operating state. In particular, the air conditioner ECU 50 can determine whether the vehicle air conditioner is in the manual or automatic mode. The operation unit ECU 160 serves as pointer operation control means together with the motor drivers 182 and 192.

Figure 6:
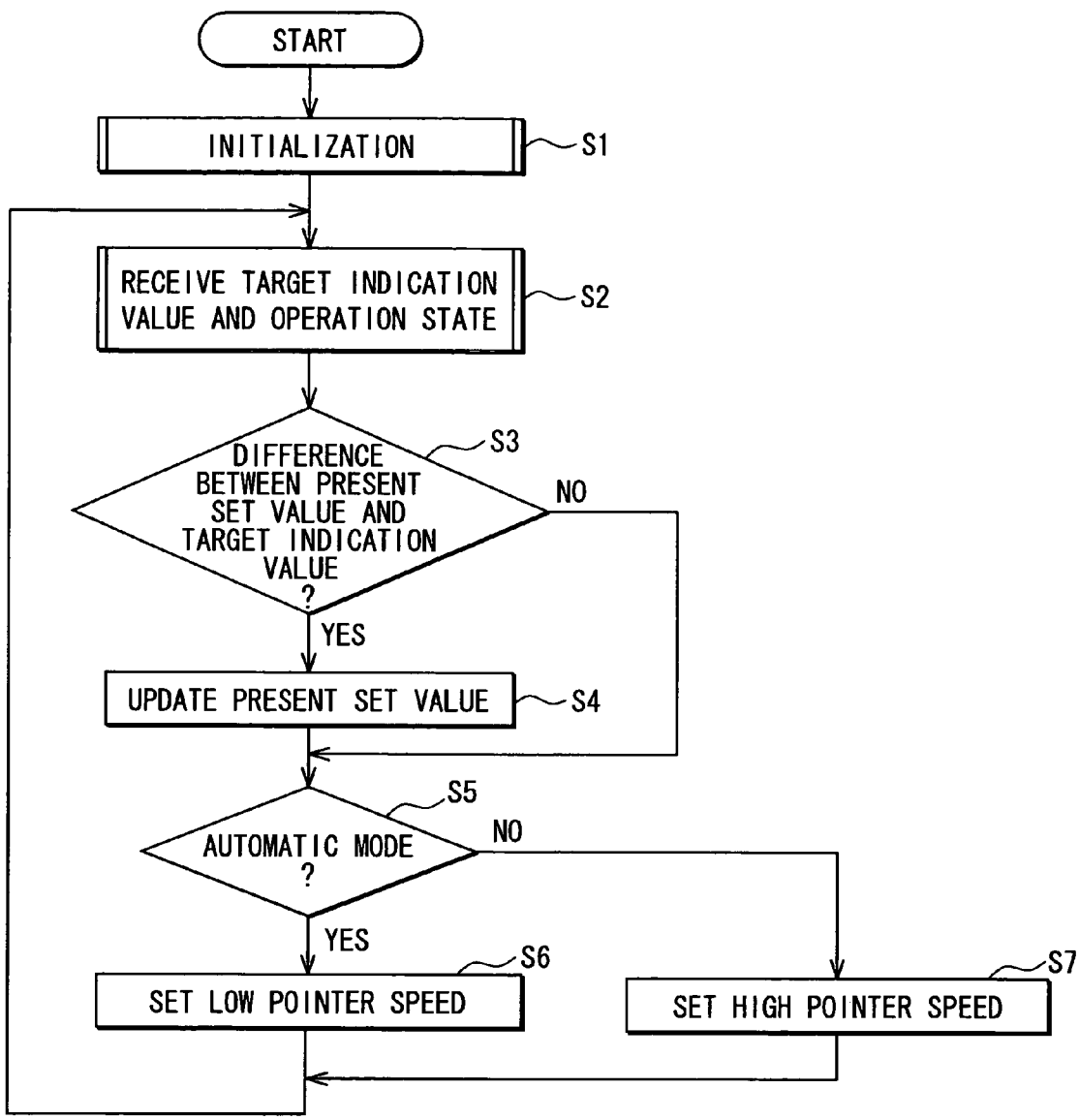
FIG. 6 is a flowchart showing a first example of a control process of the operation unit for the vehicle air conditioner according to the embodiment.

Now, the flow of the operation procedure of the first display unit 41 for displaying the air amount set value will be described as one example using a flowchart shown in FIG. 6. First, when the system is actuated, an initialization process is performed at S1. In this embodiment, in the initialization process, an angular origin point of the motor 181 structured as the stepping motor in the pointer type display device 41 is initialized by the operation unit ECU 160. Then, at S2, the air conditioner ECU 50 receives an operation state of the automatic selector switch 103 from the operation unit ECU 160 side to set the corresponding mode. When the air amount setting switch 52 is operated during the setting of the automatic mode, the operation state of the air amount setting switch 52 is sent to the air conditioner ECU 50 for setting the mode such that the automatic mode is automatically switched to the manual mode even without operating the automatic selector switch 103. The air conditioner ECU 50 sends information about whether the set mode determined is either the automatic or manual one together with a target air amount value to be displayed by the pointer, to the operation unit ECU 160.

In the manual mode, the air conditioner ECU 50 starts driving of the blower motor 23 based on an air amount set value, and sends the determined air amount set value to the operation unit ECU 160. On the other hand, in the automatic mode, an air amount value is automatically set and changed based on the flow of the automatic control of the air conditioner which is executed by the air conditioner control firmware 153a. And the set air amount value is periodically sent to the operation unit ECU 160, as a target indication value.

The operation unit ECU 160 also receives operation states of the air conditioner, such as the mode information and the air amount set value at S2. In driving the pointer 104, a command angle value (i.e., target indication value) corresponding to the target set value of the air amount that is presently valid is stored in the RAM 162. The command angle value is input to the motor driver 182. The motor driver 182 compares the input command angle value with the present angle value measured by a driving pulse counter. When there is a difference between both the input command angle value (target indication value) and the present angle value, a motor driving direction and a pulse number needed to clear the difference are computed. Based on the result of the computation, the stepping motor 41 is driven in the normal or reverse direction with the above command angle value set as the target position.

At S3, for example, the present set value of the air amount is compared with the target set value (target indication value) received. When these values are different from each other at S3, the procedure will proceed to S4, in which the present set value is updated to the target set value received. In contrast, when these values are the same at S3, the control of S4 will be omitted, and thus the updating is not performed. The procedure will proceed to S5 in which it is determined whether the received mode is the automatic or manual mode. In the manual mode, the determination result of S5 is NO, and the driving speed of the pointer is set high at S7. In the automatic mode, the driving speed of the pointer is set low at S6. A driving pulse rate of the stepping motor is stored in the pointer speed table 163T shown in FIG. 3 in the form corresponding to the specified speed type. The pulse rate corresponding to the high or low speed is read out and set as a command speed value in the motor driver 182.

Figure 4A:
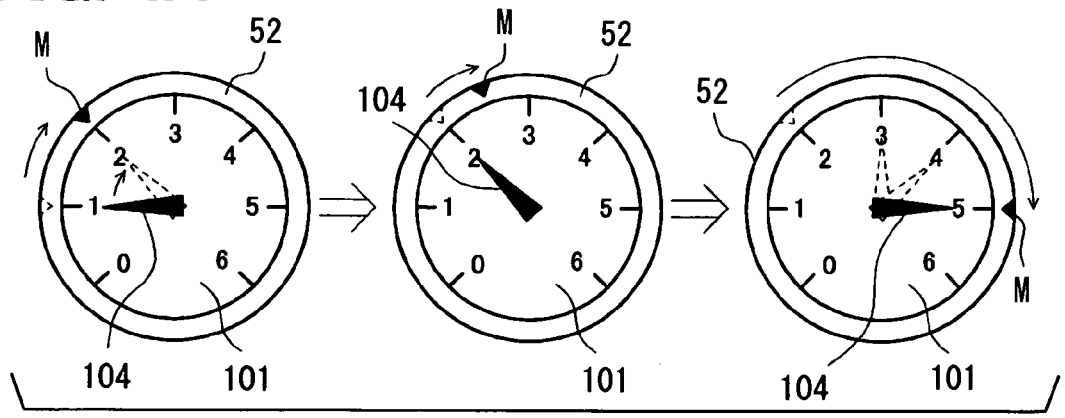
FIG. 4A is an explanatory diagram showing operation examples of the operation unit for the vehicle air conditioner in a manual mode.
Figure 4B:
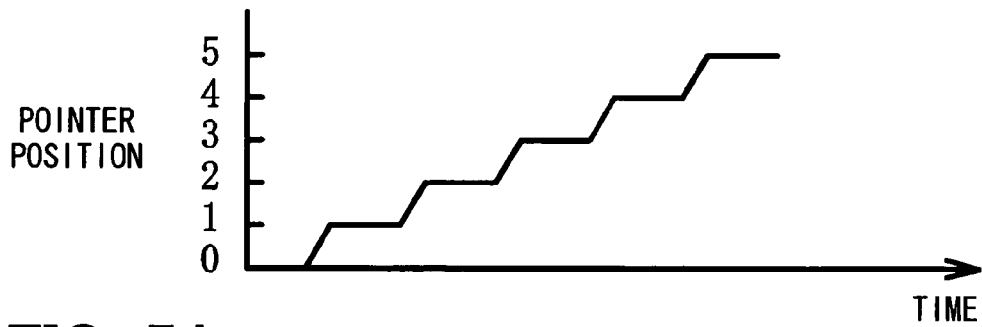
FIG. 4B is a time chart of a pointer position in the manual mode of FIG. 4A, according to the embodiment.
Figure 5A:
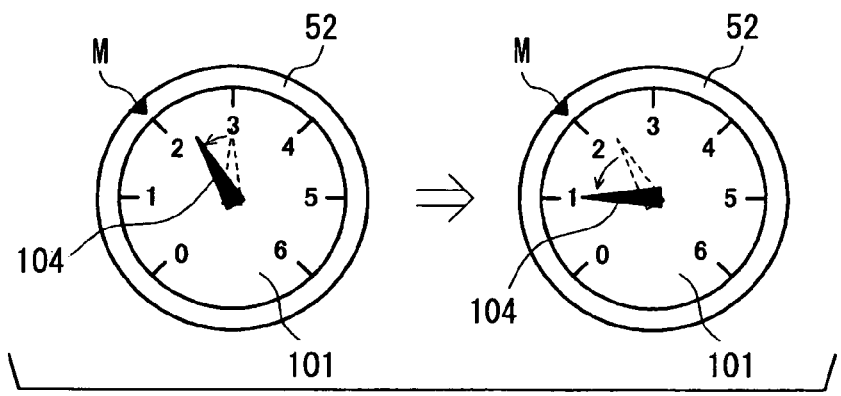
FIG. 5A is an explanatory diagram showing operation examples of the operation unit in an automatic mode.
Figure 5B:
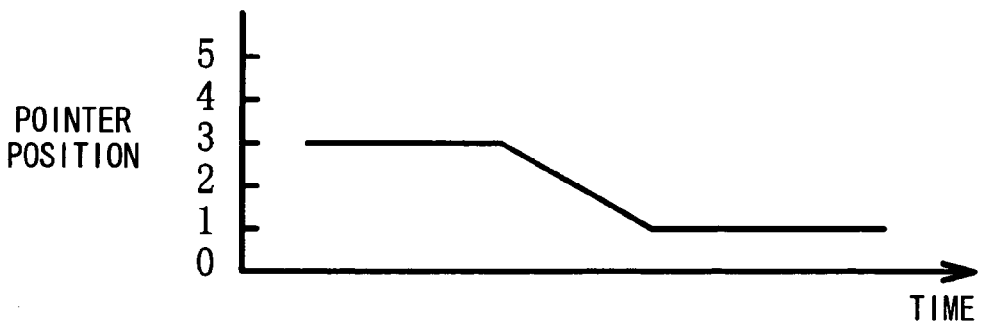
FIG. 5B is a time chart of a pointer position in the automatic mode of FIG. 5A, according to the embodiment.

As a result, when the air amount set value is changed, as shown in FIGS. 4A and 4B in the manual mode and FIGS. 5A and 5B in the automatic mode, the pointer 104 is driven at a lower speed in the automatic mode than in the manual mode. In the manual mode shown in FIGS. 4A and 4B, the quick movement of the pointer 104 following a change of the control parameter by the user allows the user to feel less strange in operation thereof. In contrast, in the automatic mode in which the control parameter is changed under the initiative of the vehicle, the movement of the pointer 104 does not need to take into consideration a user's operation intention, and thus is purposely set at a low speed. This can make an atmosphere in which the control is performed automatically and smoothly to achieve the sophistication.

The air amount setting switch 52 is constructed of a dial type operation portion, and can change the set value of the air amount (control parameter) in stages according to an input pulse of a pulse switch (not shown) with a predetermined angle set as one unit of operation. In this embodiment, seven stages of 0 to 6 are set as shown in FIGS. 4A and 5A, for example. As shown in FIG. 2, the air conditioner ECU 50 sequentially obtains an air amount setting command value input that is changed in stages by the air amount setting switch 52 from the operation unit ECU 160.

Because in the manual mode, the air conditioner ECU 50 is not a main constituent for changing the air amount, it is necessary to change the set value of the air amount, following the air amount setting command value obtained from the operation unit ECU 160 at random times. Thus, also when the air amount is changed by a large span of two or more stages by an operation of the air amount setting switch 52 on the operation unit ECU 160 side, the air amount setting command values provided on the way cannot be neglected by preference in the judgment of the air conditioner ECU 50 side. Thus, also in this case, the air conditioner ECU 50 effectively sets the air amount in response to each of all air amount setting command values received during the span of changing the air amount, and sequentially feeds back the set value determined to the operation unit ECU 160.

As a result, the operation unit ECU 160 obtains the air amount set value determined, which is to be changed in stages, from the air conditioner ECU 50, and thus the command angle value of the pointer 104, corresponding to the determined set value, is sequentially sent to the motor driver 182 at intervals corresponding to an air amount changing rate. When the air amount setting switch 52 is operated at a standard speed, for example, a speed at which a full span from the timing of the air amount of zero to that of the maximum air amount takes one or more seconds, the pointer speed in the manual mode is set such that the angle change speed in one corresponding stage of the pointer 104 becomes large enough for one stage operation speed of the switch 52. For example, the air amount setting switch 52 shown in FIG. 4A is changed from a level "1" of the air amount to a level "3" via a level "2" (see a present operation position mark M on the dial). In this case, when the air amount setting switch 52 reaches the level "2", the pointer 104 is completely moved speedily from the level "1" to the level "2". Until the air amount setting switch 52 is completely moved to the level "3", the position of the setting switch 52 is maintained. This operation is repeatedly performed until the air amount setting switch 52 reaches the last position (for example, a level "5" as shown in FIG. 4). As a result, as shown in the timing chart of FIG. 4B, the pointer 104 is driven in stages so as to temporarily stop at each air amount scale position calibrated corresponding to the unit of operation of the air amount setting switch 52. This improves the operability of the pointer 104 following the setting input operation, whereby the user feels less frustrated.

On the other hand, in the automatic mode, as shown in FIG. 5A, the pointer 104 is driven following the change of the air amount set value input from the air conditioner ECU 50 regardless of the present operation position of the air amount setting switch 52. For example, when the air amount is controlled to be automatically changed such that the input air amount set value is changed over a large span of two or more stages in units of operation of the air amount setting switch 52, the air amount set value changed as a target value is output from the air conditioner ECU 50 into the operation unit ECU 160. Referring to FIGS. 5A and 5B, the air amount set value before being changed is set to "3", and the target value input after being changed is "1". The operation unit ECU 160 updates the present command angle value "3" to "1", which is output to the motor driver 182. Then, the motor driver 182 drives the motor 181 at a lower speed than that in the manual mode such that the pointer 104 continuously moves in an angle interval corresponding to the change ("3" to "1") as shown in FIG. 5. Thus, the pointer 104 continuously moves slowly in a relatively large angle interval corresponding to the change in air set amount (in FIG. 5, by two stages in units of operation), thereby enhancing the presentation in the automatic mode.

Figure 7:
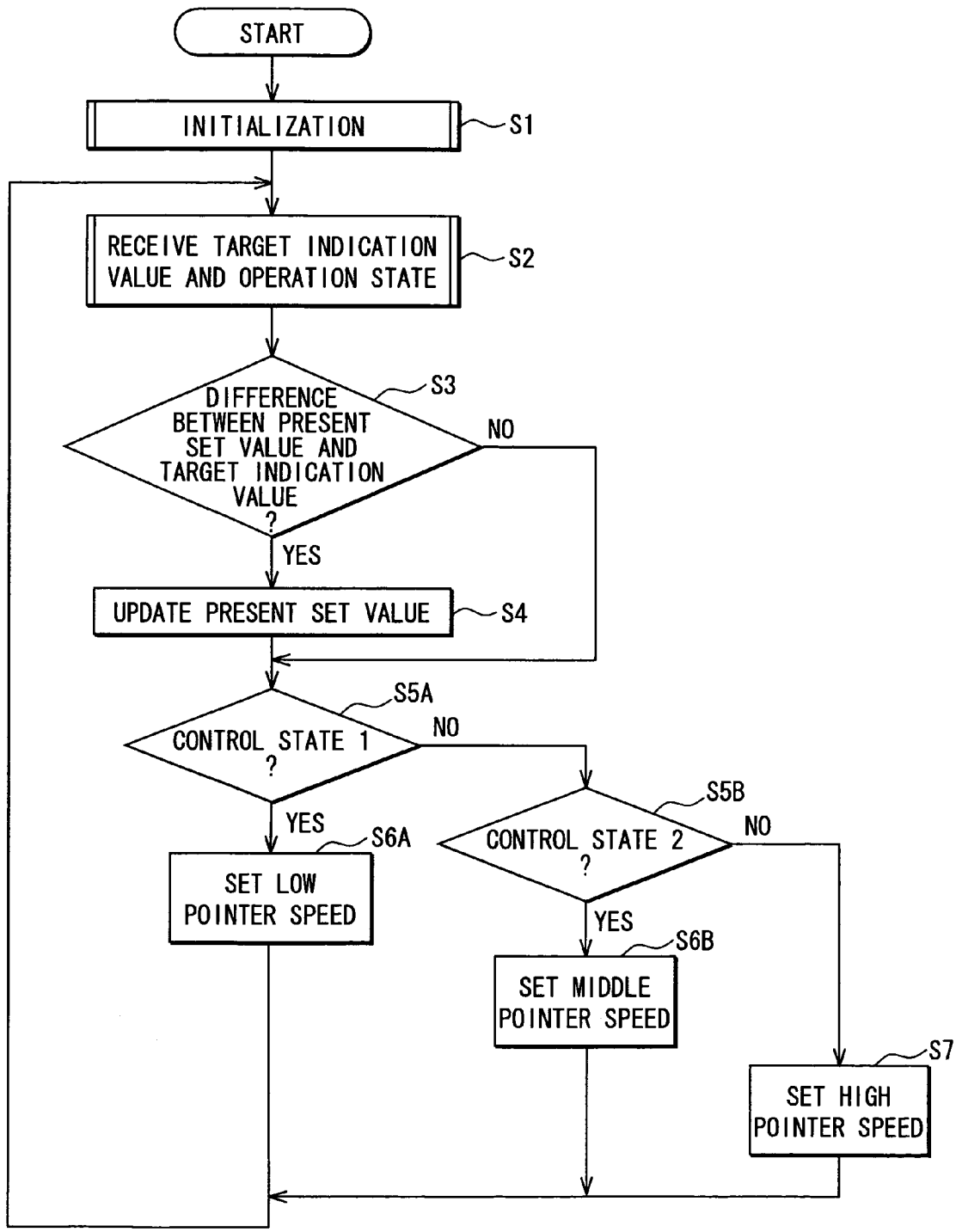
FIG. 7 is a flowchart showing a second example of a control process of the operation unit for the vehicle air conditioner according to the embodiment.

In the above-described embodiment, the operating speed of the pointer 104 is controlled to differ between the automatic mode and the manual mode. This control is performed by switching between two stages, namely, the high operating speed and the low operating speed according to either of the two operating states of the automatic and manual modes. However, three or more segmentalized operating states may be specified and the operating speed of the pointer 104 may be controlled to be switched among three or more stages. FIG. 7 is a flowchart showing a control process in which steps similar to those of FIG. 6 are designated by the same reference numbers, and branched steps segmentalized due to an increase in number of times of determination are designated by addition of a letter of the alphabet as a branch number so as to represent a relationship with respect to the steps shown in FIG. 6. In this flowchart of FIG. 7, a control state 1 which is determined to be satisfied at S5A means a preparation operating state performed for a certain time period directly after starting up the air conditioner in the automatic mode. For example, a warm-up operation is performed in a warming operation, or a cool-down operation is performed in a cooling operation such that an airflow having the unintended temperature is not drastically blown out. A control state 2 which is determined to be satisfied at S5B means a state in which the above-described preparation operation is terminated in the automatic mode and the procedure proceeds to steady control. In other cases except for those described above, the manual mode is exclusively determined to be satisfied. In the control state 1, the driving speed of the pointer is set low at S6A. In the control state 2, the driving speed of the pointer is set intermediate at S6B. In the manual mode, the driving speed of the pointer is set high at S7.

Although the operation of the first display unit 41 associated with setting of the air amount has been described above as a representative example, the second display unit 42 can be controlled by the same processing such that the operating speed of the pointer 106 differs between the automatic mode and the manual mode. In this case, the term "air amount" as used in the above-described description may be read as an air outlet, and the reference numerals indicating the components of the first display unit 41 may be read as those indicating the respective components of the second display unit 42. Alternatively, in the second display unit 42, the operating speed of the pointer 106 can be set to the same value regardless of the mode.

In the above-described arrangement of the air-conditioning control apparatus CA, the operation unit ECU 160 takes charge of the operation input control and the display output control, and also the air conditioner ECU 50 takes charge of the operation control of the air conditioner. Alternatively, one ECU may perform the overall control. This eliminates the necessity of all communication processing between both ECUs 50 and 160 via the communication bus 30 in the above-described embodiment.

Figure 8A:
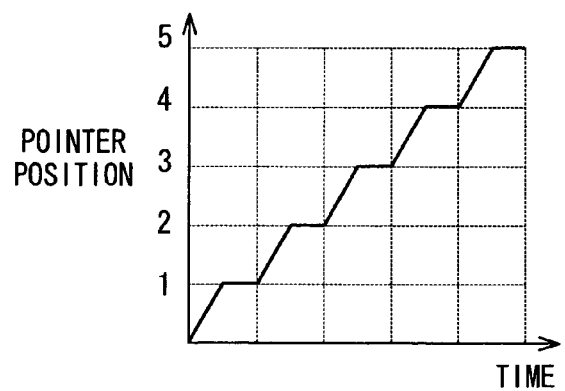
FIGS. 8A and 8B are time charts of a pointer position in a manual mode and an automatic mode, respectively, according to a first modification example of the embodiment of the present invention.
Figure 8B:
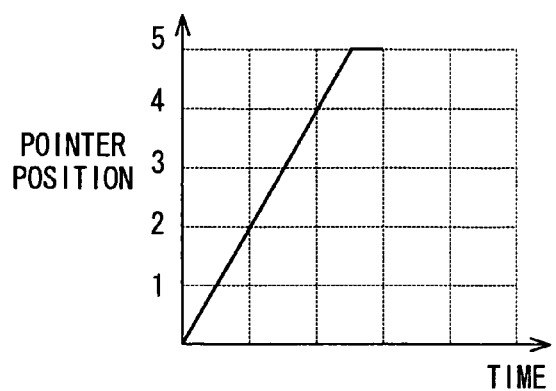
Figure 9A:
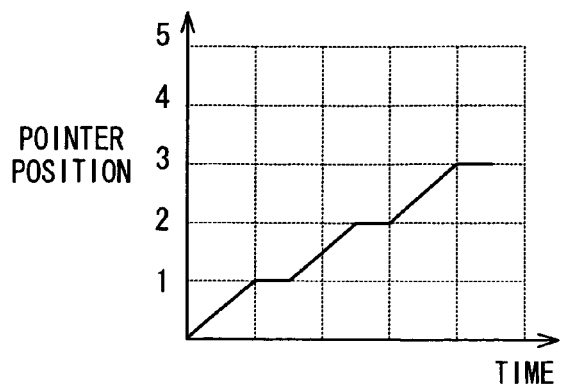
FIGS. 9A and 9B are time charts of a pointer position in a manual mode and an automatic mode, respectively, according to a second modification example of the embodiment of the present invention.
Figure 9B:
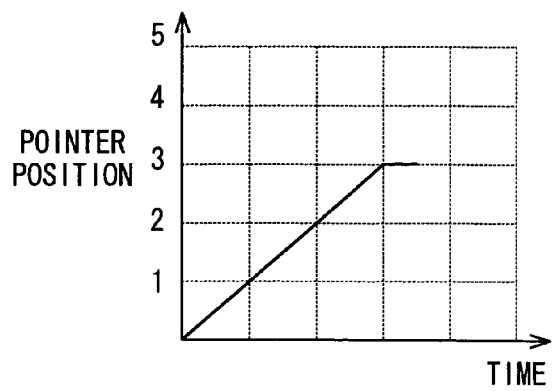

In the above-described embodiment, as shown in FIGS. 4B and 5B, the pointer 104, 106 is controlled at different moving speeds (i.e., different driving speed) while having different moving patterns in the manual mode and in the automatic mode. However, the moving speed for a predetermined time may be set equal between the manual mode and the automatic mode while the moving patterns are different from each other between the manual mode and the automatic mode. FIG. 8A is a time chart of a pointer position in a manual mode with a step movement pattern, and FIG. 8B is a time chart of a pointer position in an automatic mode with a continuous movement pattern according to a first modification example of the embodiment. As shown in FIGS. 8A and 8B, although the movement patterns of the pointer 104, 106 are set different between the manual mode and the automatic mode, the moving speed of the pointer 104, 106 can be set equal to each other in both the manual mode and the automatic mode. FIG. 9A is a time chart of a pointer position in a manual mode with a step movement pattern, and FIG. 9B is a time chart of a pointer position in an automatic mode with a continuous movement pattern according to a second modification example of the embodiment. As shown in FIGS. 9A and 9B, although the movement patterns of the pointer 104, 106 are set different between the manual mode and the automatic mode, the moving speed of the pointer 104, 106 can be set equal to each other in both the manual mode and the automatic mode.

According to an aspect of the embodiment and modifications of the present invention, an operation unit for a vehicle air conditioner includes: a display device including a dial calibrated such that a present set value of a control parameter other than a set temperature of the air conditioner is directly readable, a pointer rotatably disposed on the dial and a pointer driving motor for rotatably driving the pointer; a setting input portion of the control parameter; an obtaining portion configured to obtain the present set value of the control parameter; and an operating state identification portion configured to identify whether an air-conditioning operating state is in a plurality of predetermined operating states of the air conditioner. Furthermore, a moving pattern of the pointer is changed according to the operating state of the air conditioner. Accordingly, it can easily identify whether or not the vehicle air conditioner is in a specific operating state from the operating state of the display device.

For example, a pointer operation control portion may be configured to control an operation of the pointer driving motor such that the pointer moves on the dial at different moving speeds according to the air-conditioning operating state identified in response to a change with time in the obtained set value of the control parameter.

Alternatively, a pointer operation control portion can be configured to control an operation of the pointer driving motor, and a mode switching input portion can be configured to switch the operation of the air conditioner between a manual mode in which the set value of the control parameter is input and set manually regardless of a set temperature of the air conditioner and an automatic mode in which the control parameter is controlled to be automatically changed according to the set temperature of the air conditioner. In this case, the operating state identification portion is adapted to identify whether the air conditioner is in the manual mode or in the automatic mode, and the pointer operation control portion is adapted to drive the pointer at different speeds between in the manual mode and in the automatic mode.

For example, the control parameter is at least one of an amount of air to be blown into a vehicle compartment and an air outlet mode for an airflow from the air conditioner, and the display device displays at least one of the present set value of the amount of blown air and the air outlet mode. In the manual mode, at least one of the amount of blown air and the air outlet mode for the airflow from the air conditioner is manually set, whereas in the automatic mode, at least one of the amount of blown air and the air outlet mode for the airflow from the air conditioner is automatically switched. The display device may include a first display unit for displaying the present set value of the amount of blown air as the control parameter, and a second display unit for displaying the present set air outlet mode as the control parameter. In this case, the pointer operation control portion drives the pointer at different speeds between the manual mode and the automatic mode in at least one of the first display unit and the second display unit.

Furthermore, the pointer operation control portion drives the corresponding pointer at the different speeds between the manual mode and the automatic mode in each of the first and second display units. Alternatively, the pointer operation control portion drives the pointer at a lower speed in the automatic mode than in the manual mode.

In addition, the setting input portion can be adapted to input the set value of the control parameter so as to be capable of changing the set value in stages, the obtaining portion can sequentially obtain the set value of the control parameter input that is changed in stages by the setting input portion in the manual mode. The pointer operation control portion can drives the pointer in the manual mode in such a stepwise manner that the pointer temporarily stops at each position corresponding to the set value obtained in stages.

In contrast, in the automatic mode, the obtaining portion obtains the set value of the control parameter automatically changed as needed. Furthermore, when the set value can be automatically changed by a span corresponding to an integral multiple of two or more times of a unit of operation of the setting input portion in the manual mode, the pointer operation control portion drives the pointer in such a manner that the pointer continuously moves in an angle interval corresponding to the span.

The pointer driving motor may be a stepping motor. In this case, the pointer operation control portion sets a driving speed of the pointer based on a pulse rate input into the stepping motor.

According to another aspect of the present invention, a vehicle air-conditioning control apparatus may include the operation unit described above, and an air-conditioner driving control portion configured to control a driving of the vehicle air conditioner based on the set input value of the control parameter from the setting input portion. Furthermore, a mode switching portion may be adapted to switch the operating mode of the air conditioner between the manual mode and the automatic mode based on information input from the mode switching input portion. In this case, the air-conditioner driving control portion controls the driving of the vehicle air conditioner in either the manual or automatic mode.

Such changes and modifications are to be understood as being within the scope of the present invention as defined by the appended claims.

What is claimed is:

1. An operation unit for a vehicle air conditioner, comprising:
    a display device including a dial calibrated such that a present set value of a control parameter other than a set temperature of the air conditioner is directly readable, a pointer rotatably disposed on the dial, and a pointer driving motor for rotatably driving the pointer;
    a setting input portion operable to set a set value of the control parameter;
    a determining unit obtaining the present set value of the control parameter and determining a change of the present set value of the control parameter;
    an operating state identification unit identifying whether an air-conditioning operating state is in one of a plurality of predetermined operating states of the air conditioner; and
    a pointer operation control unit controlling an operation of the pointer driving motor such that the pointer moves on the dial at different moving velocities according to the one air-conditioning operating state, wherein the pointer moves to a position corresponding to the set value of the control parameter with a time lag after the determining unit determines the change of the present set value of the control parameter.

2. The operation unit according to claim 1, further comprising
    a mode switching input portion for switching the operation of the air conditioner between a manual mode in which the set value of the control parameter is input and set manually regardless of a set temperature of the air conditioner, and an automatic mode in which the control parameter is controlled to be automatically changed according to the set temperature of the air conditioner,
    wherein the operating state identification unit is adapted to identify whether the air conditioner is in the manual mode or in the automatic mode, and
    wherein the pointer operation control unit is adapted to drive the pointer at different velocities between in the manual mode and in the automatic mode.

3. The operation unit according to claim 2, wherein
    the control parameter is at least one of an amount of air to be blown into a vehicle compartment and an air outlet mode for an airflow from the air conditioner, and
    the display device displays at least one of the present set value of the amount of blown air and the air outlet mode.

4. The operation unit according to claim 3,
    wherein in the manual mode, at least one of the amount of blown air and the air outlet mode for the airflow from the air conditioner is manually set, whereas in the automatic mode, at least one of the amount of blown air and the air outlet mode for the airflow from the air conditioner is automatically switched,
    wherein the display device includes a first display unit for displaying the present set value of the amount of blown air as the control parameter, and a second display unit for displaying the present set air outlet mode as the control parameter, and
    wherein the pointer operation control unit drives the pointer at different velocities between the manual mode and the automatic mode in at least one of the first display unit and the second display unit.

5. The operation unit according to claim 4, wherein the pointer operation control unit drives the corresponding pointer at the different velocities between the manual mode and the automatic mode in each of the first and second display units.

6. The operation unit according to claim 3, wherein the pointer operation control unit drives the pointer at a lower velocity in the automatic mode than in the manual mode.

7. The operation unit according to claim 6,
    wherein the setting input portion is adapted to input the set value of the control parameter so as to be capable of changing the set value in stages,
    wherein the determining unit sequentially obtains the set value of the control parameter input that is changed in stages by the setting input portion in the manual mode, and
    wherein the pointer operation control unit drives the pointer in the manual mode in such a stepwise manner that the pointer temporarily stops at each position corresponding to the set value obtained in stages.

8. The operation unit according to claim 6,
    wherein the setting input portion is adapted to input the set value of the control parameter so as to be capable of changing the set value in stages,
    wherein the determining unit sequentially obtains the set value of the control parameter input that is changed in stages by the setting input portion in the manual mode,
    wherein, in the automatic mode, the obtaining means obtains the set value of the control parameter automatically changed as needed, and
    wherein, when the set value is automatically changed by a span corresponding to an integral multiple of two or more times of a unit of operation of the setting input portion in the manual mode, the pointer operation control unit drives the pointer in such a manner that the pointer continuously moves in an angle interval corresponding to the span.

9. The operation unit according to claim 1, wherein the pointer driving motor is a stepping motor, and the pointer operation control unit sets a driving velocity of the pointer based on a pulse rate input into the stepping motor.

10. A vehicle air-conditioning control apparatus comprising:
the operation unit for the vehicle air conditioner as described in claim 1; and
an air-conditioner driving control unit controlling a driving of the vehicle air conditioner based on the set input value of the control parameter from the setting input portion.

11. The vehicle air-conditioning control apparatus according to claim 10, further comprising a mode switching unit adapted to switch the operating mode of the air conditioner between the manual mode and the automatic mode based on information input from the mode switching input portion,
wherein the air-conditioner driving control unit controls the driving of the vehicle air conditioner in either the manual or automatic mode.

12. An operation unit for a vehicle air conditioner, comprising:
a display device including a dial calibrated such that a present set value of a control parameter other than a set temperature of the air conditioner is directly readable, a pointer rotatably disposed on the dial, and a pointer driving motor for rotatably driving the pointer;
a setting input portion operable to set a set value of the control parameter;
a determining portion configured to obtain the present set value of the control parameter and to determine a change of the present set value of the control parameter; and
an operating state identification portion configured to identify whether an air-conditioning operating state is in one of a plurality of predetermined operating states of the air conditioner,
wherein a moving pattern of the pointer is changed according to the operating state of the air conditioner; and
the pointer moves to a position corresponding to the set value of the control parameter with a time lag after the determining portion determines the change of the present set value of the control parameter.

13. The operation unit according to claim 12, further comprising:
a mode switching input portion configured to switch the operation of the air conditioner between a manual mode in which the set value of the control parameter is input and set manually regardless of a set temperature of the air conditioner, and an automatic mode in which the control parameter is controlled to be automatically changed according to the set temperature of the air conditioner; and
a pointer operation control portion configured to control an operation of the pointer driving motor,
wherein the operating state identification portion is adapted to identify whether the air conditioner is in the manual mode or in the automatic mode, and
wherein the pointer operation control portion is adapted to drive the pointer at different velocities between in the manual mode and in the automatic mode.

14. The operation unit according to claim 13, wherein
the control parameter is at least one of an amount of air to be blown into a vehicle compartment and an air outlet mode for an airflow from the air conditioner, and
the display device displays at least one of the present set value of the amount of blown air and the air outlet mode.

15. The operation unit according to claim 14,
wherein in the manual mode, at least one of the amount of blown air and the air outlet mode for the airflow from the air conditioner is manually set, whereas in the automatic mode, at least one of the amount of blown air and the air outlet mode for the airflow from the air conditioner is automatically switched,
wherein the display device includes a first display unit for displaying the present set value of the amount of blown air as the control parameter, and a second display unit for displaying the present set air outlet mode as the control parameter, and
wherein the pointer operation control portion drives the pointer at different velocities between the manual mode and the automatic mode in at least one of the first display unit and the second display unit.

16. The operation unit according to claim 15, wherein the pointer operation control portion drives the corresponding pointer at the different velocities between the manual mode and the automatic mode in each of the first and second display units.

17. The operation unit according to claim 14, wherein the pointer operation control portion drives the pointer at a lower velocity in the automatic mode than in the manual mode.

18. The operation unit according to claim 17,
wherein the setting input portion is adapted to input the set value of the control parameter so as to be capable of changing the set value in stages,
wherein the obtaining portion sequentially obtains the set value of the control parameter input that is changed in stages by the setting input portion in the manual mode, and
wherein the pointer operation control portion drives the pointer in the manual mode in such a stepwise manner that the pointer temporarily stops at each position corresponding to the set value obtained in stages.

19. The operation unit according to claim 17,
wherein the setting input portion is adapted to input the set value of the control parameter so as to be capable of changing the set value in stages,
wherein the obtaining portion sequentially obtains the set value of the control parameter input that is changed in stages by the setting input portion in the manual mode,
wherein, in the automatic mode, the obtaining portion obtains the set value of the control parameter automatically changed as needed, and
wherein, when the set value is automatically changed by a span corresponding to an integral multiple of two or more times of a unit of operation of the setting input portion in the manual mode, the pointer operation control portion drives the pointer in such a manner that the pointer continuously moves in an angle interval corresponding to the span.

20. The operation unit according to claim 12, further comprising
a pointer operation control portion configured to control an operation of the pointer driving motor,
wherein the pointer driving motor is a stepping motor, and the pointer operation control portion sets a driving velocity of the pointer based on a pulse rate input into the stepping motor.

21. A vehicle air-conditioning control apparatus comprising:
the operation unit for the vehicle air conditioner as described in claim 12; and
an air-conditioner driving control portion configured to control a driving of the vehicle air conditioner based on the set input value of the control parameter from the setting input portion.

22. The vehicle air-conditioning control apparatus according to claim 21, further comprising a mode switching portion adapted to switch the operating mode of the air conditioner between the manual mode and the automatic mode based on information input from the mode switching input portion, wherein the air-conditioner driving control portion controls the driving of the vehicle air conditioner in either the manual or automatic mode.

23. The operation unit according to claim 1, wherein the pointer moves after a predetermined time passes from the change of the present set value of the control parameter.

24. The operation unit according to claim 1, wherein the time lag is changed in accordance with a speed of the change of the present set value.

25. The operation unit according to claim 1, wherein the movement of the pointer in a manual operating state of the vehicle air conditioner is a stepped movement and the movement of the pointer in an automotive operation state of the vehicle air conditioner is a continuous sweeping movement.

26. The operation unit according to claim 1, wherein the different moving velocities are different rotational velocities of the pointer between a current position of the pointer and the position corresponding to the set value of the control parameter.

* * * * *